(12) United States Patent
Bian et al.

(10) Patent No.: US 11,328,479 B2
(45) Date of Patent: May 10, 2022

(54) RECONSTRUCTION METHOD, RECONSTRUCTION DEVICE, AND GENERATION DEVICE

(71) Applicant: Panasonic Intellectual Property Corporation of America, Torrance, CA (US)

(72) Inventors: Zhen Peng Bian, Singapore (SG); Pongsak Lasang, Singapore (SG); Toshiyasu Sugio, Osaka (JP); Toru Matsunobu, Osaka (JP); Satoshi Yoshikawa, Hyogo (JP); Tatsuya Koyama, Kyoto (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 154 days.

(21) Appl. No.: 16/855,316

(22) Filed: Apr. 22, 2020

(65) Prior Publication Data
US 2020/0250885 A1 Aug. 6, 2020

Related U.S. Application Data

(63) Continuation of application No. PCT/JP2018/038885, filed on Oct. 18, 2018.
(Continued)

(51) Int. Cl.
*G06T 17/20* (2006.01)
*G06T 7/00* (2017.01)
*G06V 10/44* (2022.01)

(52) U.S. Cl.
CPC .............. *G06T 17/20* (2013.01); *G06T 7/97* (2017.01); *G06V 10/443* (2022.01)

(58) Field of Classification Search
CPC .. G06K 9/4604; G06K 9/4609; G06K 9/6211; G06T 17/20; G06T 2207/30236;
(Continued)

(56) References Cited

U.S. PATENT DOCUMENTS 8,331,615 B2 12/2012 Furukawa et al.
9,078,048 B1 * 7/2015 Gargi ................. H04N 21/4782
(Continued)

OTHER PUBLICATIONS

International Search Report dated Dec. 25, 2018 in International (PCT) Application No. PCT/JP2018/038885.

*Primary Examiner* — Ming Wu
(74) *Attorney, Agent, or Firm* — Wenderoth, Lind & Ponack, L.L.P.

(57) ABSTRACT

A generation device includes: a communication interface via which two-dimensional (2D) images are to be received, the 2D images having been generated by photographing a space from different viewpoints with at least one camera; and a processor connected to the communication interface and configured to determine, according to the 2D images, a matching pattern to match feature points included in two pictures among the 2D images, match the feature points according to the matching pattern in order to generate first three-dimensional (3D) points, the first 3D points indicating respective first positions in the space, generate second 3D point based on the 2D images, the second 3D point indicating a second position in the space, and generate a 3D model of the space based on the first 3D points and the second 3D point.

8 Claims, 14 Drawing Sheets

Related U.S. Application Data

(60) Provisional application No. 62/575,723, filed on Oct. 23, 2017.

(58) Field of Classification Search
CPC ..... G06T 7/11; G06T 7/44; G06T 7/55; G06T 7/97
See application file for complete search history.

(56) References Cited

U.S. PATENT DOCUMENTS

| | | | | |
|---|---|---|---|---|
| 2009/0295711 | A1* | 12/2009 | Nakamura | G06T 7/596 348/42 |
| 2012/0093362 | A1* | 4/2012 | Liu | G06V 20/52 382/103 |
| 2015/0146921 | A1* | 5/2015 | Ono | G06V 40/10 382/103 |
| 2017/0084037 | A1* | 3/2017 | Barajas Hernandez | G01C 21/26 |

* cited by examiner

CAMERA LAYOUT EXAMPLE
OF STANDALONE CAMERAS

CAMERA LAYOUT EXAMPLE
INCLUDING CAMERA GROUP

RECONSTRUCTION METHOD, RECONSTRUCTION DEVICE, AND GENERATION DEVICE

CROSS REFERENCE TO RELATED APPLICATIONS

This application is a U.S. continuation application of PCT International Patent Application Number PCT/JP2018/038885 filed on Oct. 18, 2018, claiming the benefit of priority of U.S. Provisional Patent Application No. 62/575,723 filed on Oct. 23, 2017, the entire contents of which are hereby incorporated by reference.

BACKGROUND

1. Technical Field

The present disclosure relates to a reconstruction method, a reconstruction device, and a generation device.

2. Description of the Related Art

U.S. Pat. No. 8,331,615 B2 (Patent Literature 1) discloses a three dimensional (3D) reconstruction method in which multi-view stereopsis for reconstructing a 3D model of an object from a plurality of images is used.

SUMMARY

According to one aspect of the present disclosure, a generation device includes: a communication interface via which two-dimensional (2D) images are to be received, the 2D images having been generated by photographing a space from different viewpoints with at least one camera; and a processor connected to the communication interface and configured to determine, according to the 2D images, a matching pattern to match feature points included in two pictures among the 2D images, match the feature points according to the matching pattern in order to generate first three-dimensional (3D) points, the first an points indicating respective first positions in the space, generate a second 3D point based on the 2D images, the second 3D point indicating a second position in the space, and generate a 3D model of the space based on the first 3D points and the second 3D point.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
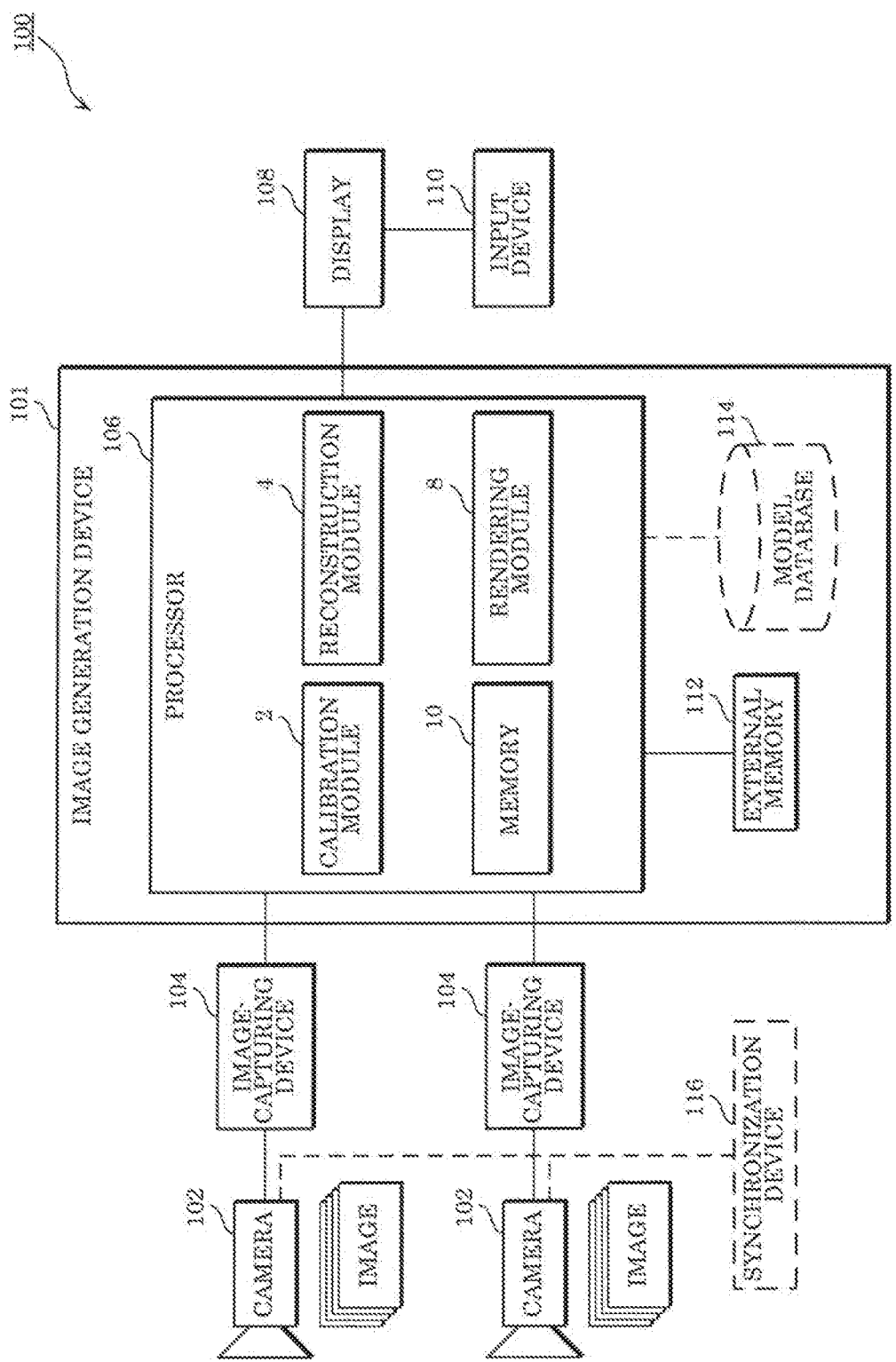
FIG. 1 is a block diagram illustrating an example of the configuration of an image generation system according to an embodiment.

Underlying Knowledge Forming Basis of the Present Disclosure

Conventionally, there have been two approaches as a method for reconstructing a three-dimensional (3D) scene. With the first approach, a depth map is reconstructed using two images consisting of a right-eye image and a left-eye image. For this processing, the positions of two cameras chat captures the tow images needs to be strictly set as left and right eyes. A plurality of depth maps from various viewpoints may further be fused to a single 3D scene model.

With the second approach, a 3D model of the scene is constructed from various viewpoints. The positions of a plurality of cameras that captures a plurality of images do not need to be strictly set unlike the case of the first approach in which the depth map is used. In other words, the second approach is more flexible than the first approach. However, the 3D reconstruction method is far more difficult than in the first approach. With this approach, it is usually possible to reconstruct only sparse 3D point clouds, most of which belongs to textured regions. With either approach, in textureless regions, the result of reconstructing a 3D point cloud is not accurate or reliable.

Therefore, there has been a demand for effective 3D reconstruction appropriate for both of textured and texture-less regions.

Thus, a reconstruction method according to one aspect of the present disclosure is for reconstructing a three-dimensional (3D) model by a processor using a plurality of two-dimensional (2D) images obtained by a plurality of cameras disposed in different positions and attitudes capturing a same target space in a 3D space. The reconstruction method includes: determining, according to image information of each of the plurality of 2D images, a size and a shape of a matching pattern to be used in a matching process for feature points included in the plurality of 2D images; reconstructing a first 3D point cloud including a plurality of 3D points by performing the matching process based on the matching pattern determined; generating a second 3D point cloud including 3D points increased by adding a new 3D point to the first 3D point cloud using the plurality of 2D images; and reconstructing the 3D model using the second 3D point cloud.

Thus, the matching process is performed using a matching pattern of a size and shape dynamically changed according to image information, enabling reconstruction of an appropriate 3D point according to the region as well as enabling a reduction in processing time.

Furthermore, the determining may include: classifying, as a textured region and a texture-less region, one or more regions included in each of the plurality of 2D images; determining a pattern of a first size as the matching pattern for a first region classified as the textured region; and determining a pattern of a second size larger than the first size as the matching pattern for a second region classified as the texture-less region.

Thus, the time required for the reconstruction process in the textured region can be reduced, and it is possible to efficiently perform the process. Furthermore, in the texture-less region, the matching process for feature points is performed using the second size larger than the first size, and thus it is possible to reconstruct an appropriate 3D point according to the region.

Furthermore, the classifying may include: calculating a variance map and an edge map based on pixel values of a plurality of pixels included in each of the plurality of 2D images; and classifying the one or more regions included in the 2D image as the textured region and the texture-less region using the variance map and the edge map calculated.

Thus, it is possible to effectively classify the regions in the 2D image as textured and texture-less regions.

Furthermore, a reconstruction device according to one aspect of the present disclosure reconstructs a three-dimensional (3D) model using a plurality of two-dimensional (2D) images obtained by a plurality of cameras disposed in different positions and attitudes capturing a same target space in a 3D space. The reconstruction device includes: a processor which performs operations including: determining, according to image information of each of the plurality of 2D images, a size and a shape of a matching pattern to be used in a matching process for feature points included in the plurality of 2D images; reconstructing a first 3D point cloud including a plurality of 3D points by performing the matching process based on the matching pattern determined; generating a second 3D point cloud including 3D points increased by adding a new 3D point to the first 3D point cloud using the plurality of 2D images; and reconstructing the 3D model using the second 3D point cloud.

Thus, the matching process is performed using a matching pattern of a size and shape dynamically changed according to image information, enabling reconstruction of an appropriate 3D point according to the region as well as enabling a reduction in processing time.

Note that the aforementioned general or specific aspects may be implemented using a system, a method, an integrated circuit, a computer program, or a computer-readable recording medium such as a CD-ROM, or any combination of systems, methods, integrated circuits, computer programs, or recording media.

Hereinafter, a reconstruction method and a reconstruction device according to one aspect of the present disclosure will be specifically described with reference to the drawings.

Note that the embodiment described below shows a specific example of the present disclosure. The numerical values, shapes, materials, structural elements, and the arrangement and connection of the structural elements, steps, the processing order of the stops etc., shown in the following embodiment are mere examples, and are not intended to limit the present disclosure. Accordingly, among the structural elements in the following embodiment, structural elements not recited in any one of the independent claims which indicate the broadest concepts will be described as arbitrary structural elements.

Embodiment

An image generation system according to an embodiment will be described.

FIG. 1 is a block diagram illustrating an example of the configuration of the image generation system according to the embodiment.

As illustrated in FIG. 1, image generation system 100 includes a plurality of cameras 102, a plurality of image-capturing devices 104 connected to corresponding ones of the plurality of cameras 102, image generation device 101, display 108, and input device 110. Image generation system 100 may further include synchronization device 116.

The plurality of cameras 102 are disposed in different positions and secured in different attitudes, and capture images of the same target space in a 3D space. This allows the plurality of cameras 102 to obtain a plurality of images captured from different viewpoints in different viewing directions. Each of the plurality of images that are individually obtained is a two dimensional (2D) image. The plurality of cameras 102 may obtain the plurality of images by capturing each image with a different timing. The plurality of cameras 102 may be cameras that capture moving images including a plurality of frames as the plurality of images at a predetermined frame rate, for example. The timings of image-capturing by the plurality of cameras 102 may be synchronized by synchronization device 116. Note that although image generation system 100 in FIG. 1 includes two cameras 102, image generation system 100 may include two or more cameras 102.

The plurality of image-capturing devices 104 are provided corresponding to the plurality of cameras 102, respectively, store images captured by the plurality of cameras 102, and output the stored images to processor 106. Note that the plurality of image-capturing devices 104 may be embedded in the plurality of cameras 102. In other words, each of the plurality of cameras 102 may include the function of image-capturing device 104.

Image generation device 101 includes processor 100, external memory 112, and model database 114. Processor 106 includes calibration module 2, reconstruction module 4, rendering module 8, and memory 10. Image generation device 101 is an example of the reconstruction device.

Calibration module 2 obtains respective camera parameters of the plurality of cameras 102 by performing calibration of the plurality of cameras 302. The camera parameters include: external parameters indicating the position and the attitude of a camera in a 3D space; and internal parameters indicating optical properties such as the local length, the aberration, and the image center of the camera. The calibration method may be performed using the structure from motion (SFM) technique or may be performed according to a known calibration pattern, for example. The calibration process may be performed at once or may be performed gradually in order to address a change in setup or movement. The calibration process is performed, for example, before the 3D reconstruction, and the camera parameter that has been obtained is stored into the external memory.

Reconstruction module 4 reconstructs a dense, accurate 3D model using a plurality of 2D images captured by the plurality of cameras 102 and the respective camera parameters of the plurality of cameras 102. At the time of reconstructing the 3D model, reconstruction module 4 reads the camera parameter stored in the external memory and uses the camera parameter that has been read.

Rendering module 8 renders or generates virtual image of a 3D scene using the 3D model reconstructed by reconstruction module 4 and the plurality of images obtained from the plurality of cameras 102. Rendering module 8 outputs the rendered or generated virtual image to display 108. The virtual image is a 2D image of a target space in a 3D space the images of which are to be captured by the plurality of cameras 102, viewed from a virtual viewpoint different from the viewpoints of the plurality of cameras 102.

The functions of calibration module 2, reconstruction module 4, and rendering module 8 of processor 106 may each be implemented by a general purpose processor executing a program or may each be implemented using a dedicated circuit. In other words, functions may be implemented with software or may be implemented with hardware.

Memory 10 may temporarily store intermediate data generated in each process performed by calibration module 2, reconstruction module 4, and rendering module 8.

Display 108 connected to processor 106 displays the virtual image output by rendering module 8. In other words, display 108 is a device that displays an image output from processor 106 and is provided, for example, in the form of a liquid-crystal display, an organic electroluminescent (EL) display, or the like. The image output from processor 106 may include a graphical user interface (GUI) for receiving an input.

Input device 110 is connected to display 108, receives, from a user, an input that indicates a virtual viewpoint desired by the user, and outputs, to display 108, an input signal indicating the received input. The number of virtual viewpoints and the camera path may be reconstructed on the basis of predetermined patterns for instructing rendering module 8 to generate virtual views, input device 110 is implemented, for example, in the form of a remote controller, a gamepad, a mouse, a keyboard, and the like.

Note that when receiving the input signal, display 108 may switch display to a virtual image corresponding to the input signal among the plurality of virtual images viewed from the plurality of virtual viewpoints that have been received from processor 106.

Furthermore, when display 108 ha not received from processor 106 the plurality of virtual images viewed from the plurality of viewpoints, display 108 may transmit the input signal to processor 106. In tins case, processor 106 generates a virtual image that is viewed from a viewpoint corresponding to the received input signal, and outputs the generated virtual image to display 108. Subsequently, display 108 displays the virtual image output from processor 106. In this case, input device 110, which does not need to be connected to display 108, may be directly connected to processor 106 and configured to transmit the input signal to processor 106.

Note that the connection described with reference to FIG. 1 is for communication and does not need to be wired electrical connection and may be wireless connection. In other words, the connection may be wired connection for communication or may be wireless connection for communication.

External memory 112 may store, for example, information required by processor 106 such as a program. External memory 112 may store data resulting from processing of processor 106.

A pre-reconstructed model of the scene to be used in reconstruction module 4 or rendering module 8 is stored in model database 114.

Figure 2:
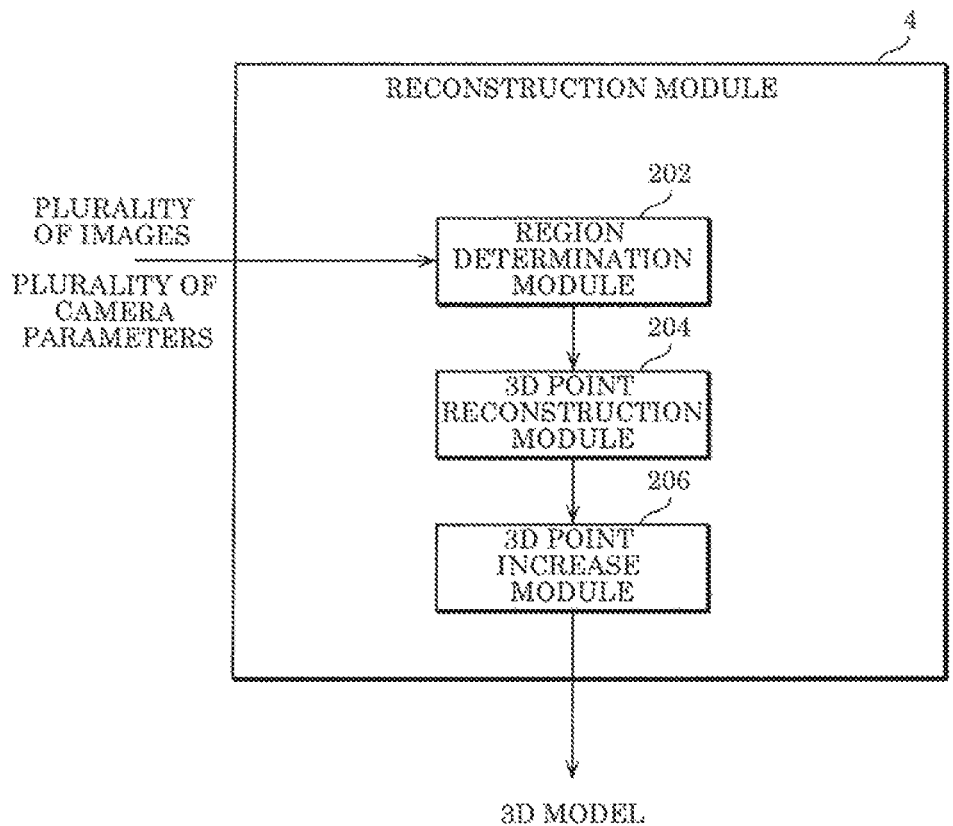
FIG. 2 is a block diagram illustrating the first example of processing blocks of a reconstruction module according to an embodiment.

FIG. 2 is a block diagram illustrating the first example of processing blocks of the reconstruction module according to the embodiment.

Reconstruction module 4 includes region determination module 202, 3D point reconstruction module 204, and 3D point increase module 206. Reconstruction module 4 obtains a plurality of images captured by the plurality of cameras 102 and a plurality of camera parameters in one-to-one correspondence with the plurality of cameras 102. The plurality of images and the plurality of camera parameters that have been obtained are input to region determination module 202. Note that each of the plurality of images obtained by reconstruction module 4, in other words, each of the plurality of images captured by the plurality of cameras 102, is a 2D image.

Region determination module 202 classifies, as textured and texture-less regions, one or more regions included in each of the plurality of images that have been obtained. Specifically, region determination module 202 determines whether each of the one or more regions included in each of the plurality of images is a textured region or a texture-less region. A specific example of the region determination process in region determination module 902 will be described later.

Three-dimensional point reconstruction module 204 reconstructs a sparse 3D point cloud on the basis of a matching pattern of a size and shape corresponding to the determination result of region determination module 202.

On the basis of the matching pattern of the size and shape corresponding to the determination result of region determination module 202, 3D point increase module 206 adds a new 3D point to a first 3D point cloud which is the sparse 3D point cloud reconstructed by 3D point reconstruction module 204. Thus, 3D point increase module 206 generates a second 3D point cloud including a plurality of dense 3D points resulting from the addition of the 3D point. Using the second 3D point cloud that has been obtained, 3D point increase module 206 reconstructs a 3D model.

Note that the functions of the modules included in reconstruction module 4 are each implemented by a general purpose processor executing a program, but this is not limiting; these functions may each be implemented using a dedicated circuit. In other words, these functions may be implemented with software or may be implemented with hardware.

Here, reconstruction module 4 can reconstruct a 3D point cloud using a matching pattern of a fixed size and shape in the matching process for feature points. However, the use of the matching pattern of the fixed size and shape has three drawbacks. The first drawback is that because the matching pattern of an appropriate size is different for each of the textured and texture-less regions, the use of the matching pattern of the fixed size and shape does not ensure accuracy for both of the textured and texture-less regions at the same time. The second drawback is that the process of reconstructing the 3D point cloud requires long time if a matching pattern of a large size is used in response to the need to increase the size of the matching pattern to generate the 3D point cloud using the texture-less region. The third drawback is that because, when the matching pattern of the fixed size and shape is used, a foreground object and a background object are covered in the same matching pattern, the reconstructed 3D point cloud is larger than a real object for the foreground object. In order to address those drawbacks, the matching pattern to be used for matching in the 3D reconstruction process in reconstruction module 4 is dynamically changed according to image information of each of the plurality of images input to reconstruction module 4. Image information is information indicating whether each of one or more regions included in one image is a textured region or a texture-less region. For example, for each of the one or more regions included in the image, when the region is a textured region, reconstruction module 4 performs a matching process for feature points using a matching pattern of a first size smaller than a second size which is used when the region is a texture-less region. Thus, the time required for the reconstruction process in the textured region can be reduced, and it is possible to efficiently perform the process. Furthermore, in the texture-less region, the matching process for feature points is performed using the second size larger than the first size, and thus it is possible to improve accuracy and robustness. The shape of the matching pattern used in the matching process for feature points is not fixed, and an extension part does not cover the textured region; therefore, it is possible to reduce the occurrence of a 3D point cloud for a foreground object becoming larger than a real object. Thus, reconstruction module 4 performs the matching process for feature points by applying conceptually different matching patterns to the textured region and the texture-less region, and therefore it is possible to improve accuracy, robustness, and processing time.

Figure 3:
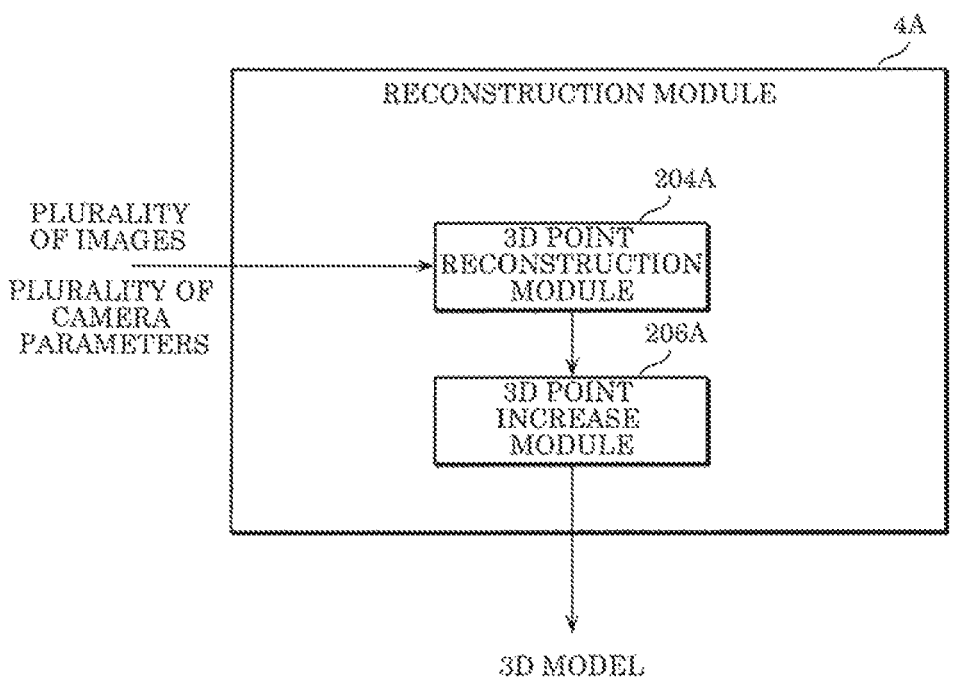
FIG. 3 is a block diagram illustrating the second example of processing blocks of a reconstruction module according to an embodiment.

FIG. 3 is a block diagram illustrating the second example of processing blocks of the reconstruction module according to the embodiment.

Reconstruction module 4A includes 3D point reconstruction module 204A and 3D point increase module 206A. Reconstruction module 4A obtains a plurality of images captured by the plurality of cameras 102 and a plurality of camera parameters in one-to-one correspondence with the plurality of cameras 102. Reconstruction module 4A in the second example is different in that each of 3D point reconstruction module 204A and 3D point increase module 206A performs the same region determination process as the region determination process performed by region determination module 202 of reconstruction module 4 in the first example. The other configurations are the same as or similar to those of reconstruction module 4 in the first example, and therefore description thereof will be omitted. Note that the second example is not as efficient as the first example because the region determination process is performed in each of 3D point reconstruction module 204A and 3D increase module 206A and there are cases where the same process is repeated.

Figure 4:
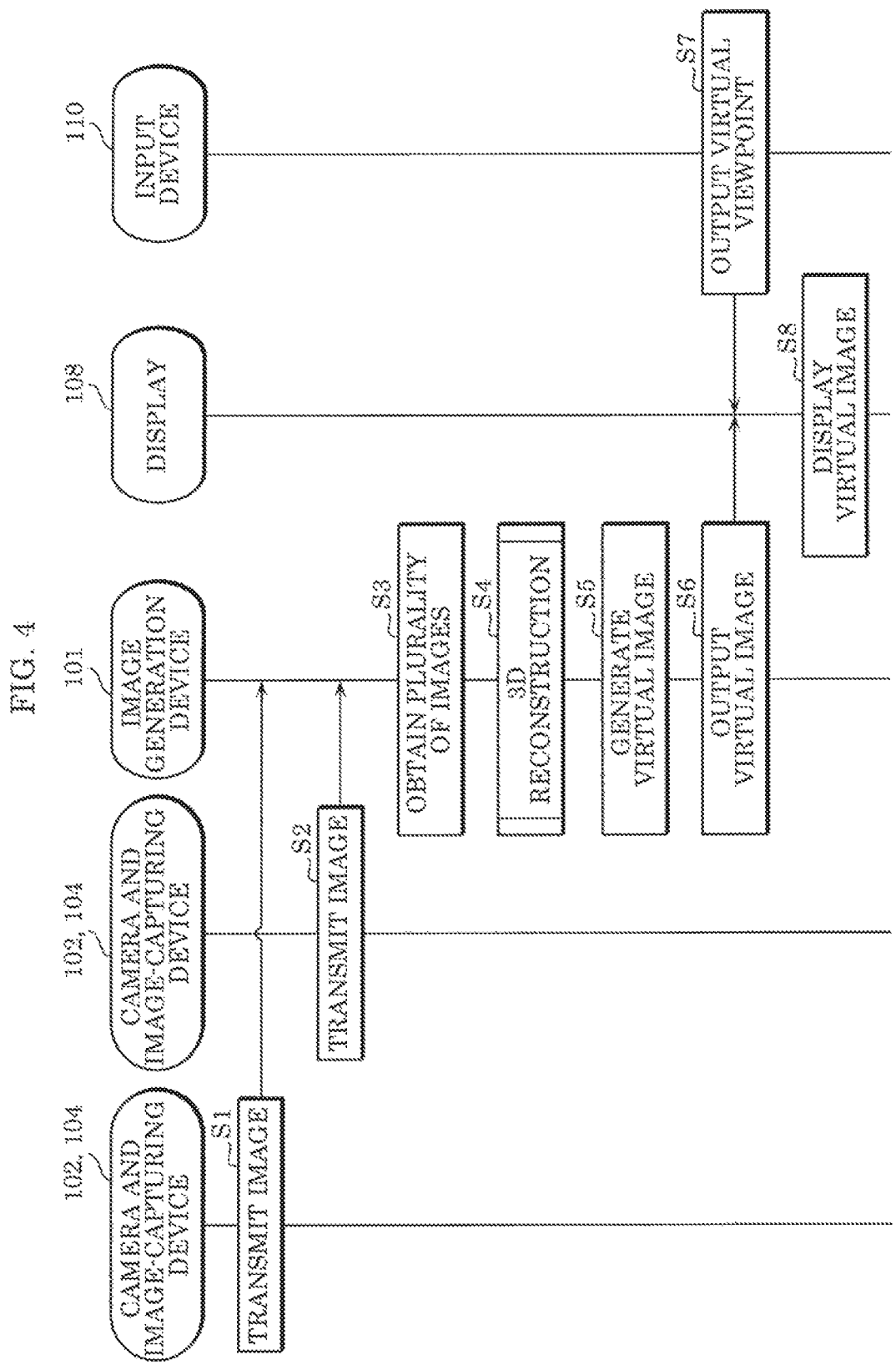
FIG. 4 is a sequence diagram illustrating an example of operations performed by an image generation system according to an embodiment.

FIG. 4 is a sequence diagram illustrating an example of operations performed by the image generation system according to the embodiment.

One image-capturing device 104 transmits, to image generation device 101, an image captured by one camera 102 (S1). Similarly, another image capturing device 104 transmits, to image generation device 101, an image captured by another camera 162 (S2).

Next, in image generation device 101, processor 106 obtains a plurality of images captured by the plurality of cameras 102 (S3). At this time, processor 106 may obtain a plurality of images captured by the plurality of cameras 102 with the same timing.

Subsequently, reconstruction module 4 of processor 106 generates a 3D model using the plurality of obtained images and the camera parameters of the plurality of cameras 102 obtained by the calibration process are performed by calibration module 2 (S4).

Rendering module 8 of processor 106 generates, using the generated 3D model and the plurality of images, a virtual image of the target space viewed from the virtual viewpoint (S5).

Rendering module 8 outputs the generated virtual image to display 108 (S6).

Input device 110 outputs, to display 108, an input signal indicating a virtual viewpoint desired by a user (S7).

Display 108 displays a virtual image corresponding to the input signal among virtual images output by image generation device 101 (S8).

Figure 5:
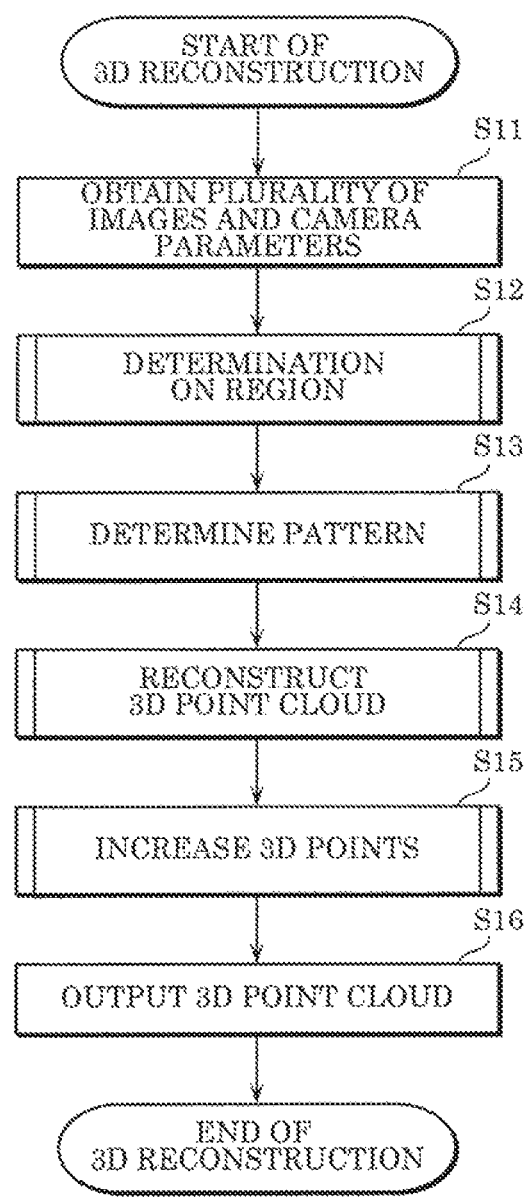
FIG. 5 is a flowchart illustrating the first example of processing in a 3D reconstruction method according to an embodiment.

FIG. 5 is a flowchart illustrating the first example of processing in the 3D reconstruction method according to the embodiment. Specifically, the flowchart in FIG. 3 illustrates an example of processing in the 3D reconstruction method performed by reconstruction module 4.

First, reconstruction module 4 obtains, from the plurality of image-capturing devices 104, a plurality of images captured by the plurality of cameras 102 and a plurality of camera parameters in one-to-one correspondence with the plurality of cameras 102 (S11).

Next, for each of the plurality of obtained plurality of images, region determination module 202 of reconstruction module 4 performs a region determination process of determining whether one more regions include in the image are textured or texture-less regions (S12). Thus, region determination module 202 classifies the regions included in each of the plurality regions as textured and texture-less regions. Details of the region determination process will be described later with reference to FIG. 7.

Region determination module 202 performs a pattern determination process for determining the size and shape of the matching pattern to be used in the matching process for feature points included in the plurality of 2D images according to image information of each of the plurality of obtained images (S13). Details of the pattern determination process will be described later with reference to FIG. 8.

Three-dimensional point reconstruction module 204 of reconstruction module 4 reconstructs a first 3D point cloud including a plurality of 3D points by performing the matching process on the basis of the matching pattern that has been determined (S14). Details of the process of reconstructing the 3D point cloud will be described later with reference to FIG. 9 to FIG. 11.

Three-dimensional point increase module 206 of reconstruction module 4 generates the second 3D point cloud, including 3D points increased by adding, using the plurality of images, a new 3D point to the first 3D point cloud that has been reconstructed (S15). Details of the process of increasing 3D points will be described later with reference to FIG. 12 and FIG. 13.

Reconstruction module 4 outputs the second 3D point cloud which is a dense 3D point cloud obtained by increasing the 3D points in Step S14 (S16).

Figure 6:
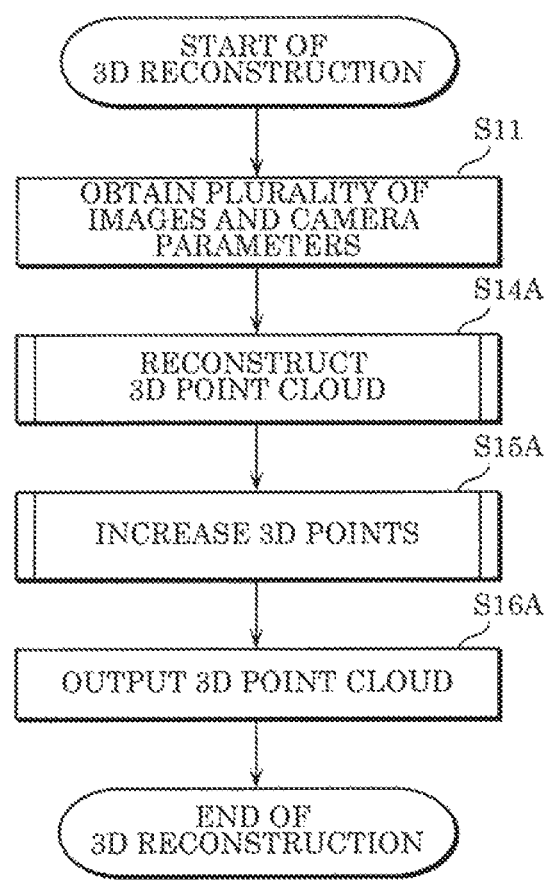
FIG. 6 is a flowchart illustrating the second example of processing in a 3D reconstruction method according to an embodiment.

FIG. 6 is a flowchart illustrating the second example of the processing in the 3D reconstruction method according to the embodiment. Specifically, the flowchart in FIG. 6 illustrates an example of processing in the 3D reconstruction method performed by reconstruction module 4A.

Reconstruction module 4A obtains, from the plurality of image-capturing devices 104, a plurality of images captured by the plurality of cameras 102 and a plurality of camera parameters in one-to-one correspondence with the plurality of cameras 102 (S11).

Next, 3D point reconstruction module 204A of reconstruction module 4A performs the region determination process and the pattern determination process on each of the plurality of images, and reconstructs the first 3D point cloud on the basis of the matching pattern of the size and shape corresponding to the processing result (S14A).

Three-dimensional point increase module 206A of reconstruction module 4A performs the region determination process and the pattern determination process on each of the plurality of images, and on the basis of the matching pattern of the size and shape corresponding to the determination result, increases the 3D points in first 3D point cloud that has been reconstructed (S15A).

Reconstruction module 4A outputs the second 3D point cloud which is a dense 3D point cloud obtained by increasing the 3D points in Step S14A (S16A).

Figure 7:
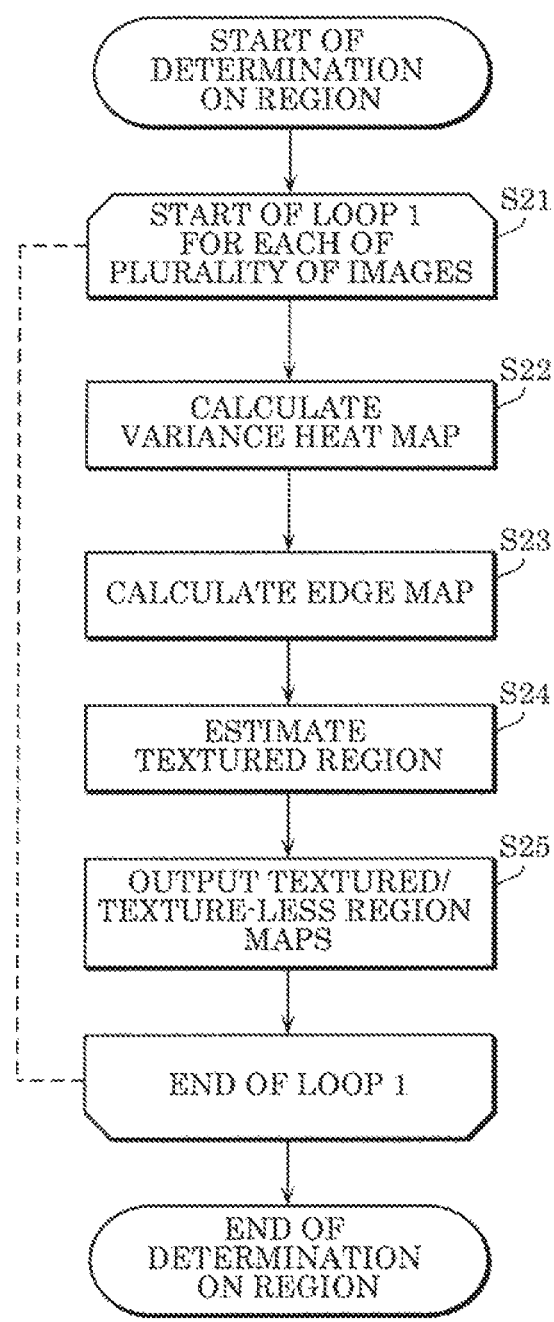
FIG. 7 is a flowchart illustrating an example of a region determination process according to an embodiment.

FIG. 7 is a flowchart illustrating an example of the region determination process according to the embodiment.

First, using the plurality of images and camera parameters, region determination module 202 starts loop 1 in which the processing in Steps S22 to S25 described below is performed for each of the plurality of images (S21).

Region determination module 202 calculates a variance heat map for the current image (S22). The variance heat map is, for example, variance calculated for each of a plurality of pixels included in an image and includes variance of pixel values of the plurality of pixels included in a predetermined region based on the current pixel. The variance is, for example, variance of the pixel values in a region of m×n pixels centered on a first pixel and corresponds to the first pixels. Here, each of m and n is an integer of 2 or more, and m and n may be equal to each other or may be different from each other. The pixel values may be the luminance values of pixels or may be values obtained from the RGB values of pixels. Thus, the variance heat map includes a plurality of variances calculated based on the plurality of pixels included in the current image.

Note that the variance heat map does not need to include variance corresponding to each of the plurality of pixels included in the current image and may include variance calculated for each of a plurality of regions obtained by dividing the current image.

Region determination module 202 calculates an edge map for the current image (S23). The edge map is information indicating an edge distribution in the image, for example. Using the calculated edge map, region determination module 202 can segment the image into a plurality of regions.

For each of one or more regions included in the current image, region determination module 202 estimates whether the region is a textured region or a texture-less region (S24). Specifically, for each of the plurality of regions resulting from the segmentation using the edge map, region determination module 202 determines whether the region includes a pixel or a region corresponding to variance exceeding a threshold value in the variance heat map. When the region includes a pixel or a region corresponding to variance exceeding the threshold value, region determination module 202 determines the region as a textured region; when the region does not include a pixel or a region corresponding to variance exceeding the threshold value, region determination module 202 determines the region as a texture-less region.

Subsequently, using the estimation result, region determination module 202 generates textured/texture-less region maps indicating textured and texture-less regions in the regions included in the current image (S25).

After Step S25, region determination module 202 performs Steps S22 to S25 on a subsequent image among the plurality of images on which the processing in loop 1 has not yet been performed.

Note that in reconstruction module 4 in the first example, region determination module 202 performs the region determination process, but, as described above in the case of reconstruction module 4A in the second example, each of 3D point reconstruction module 204A and 3D point increase module 206A may perform the region determination process.

Figure 8:
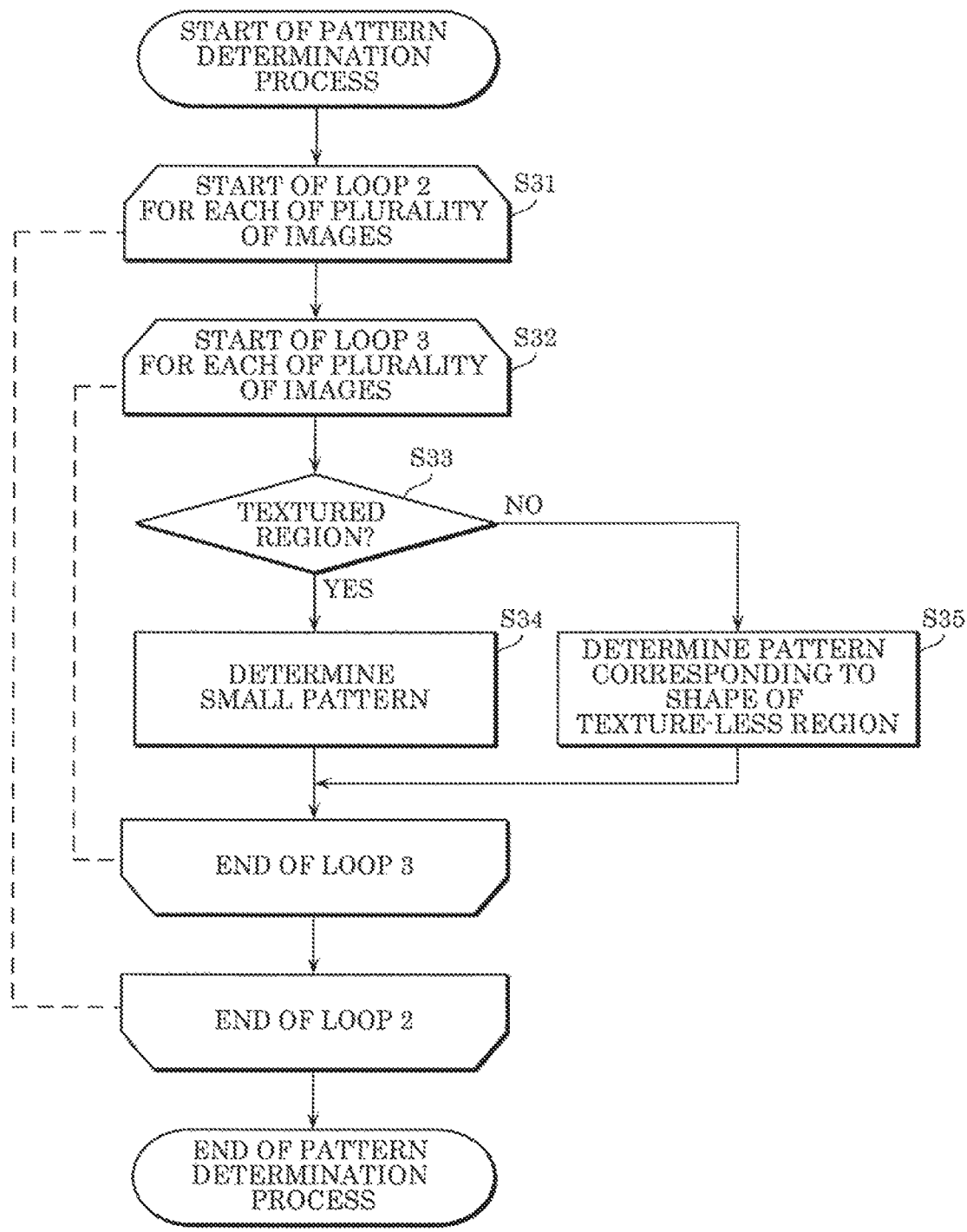
FIG. 8 is a flowchart illustrating an example of a pattern determination process according to an embodiment in which a pattern to be used in a matching process for feature points is determined.

FIG. 8 is a flowchart illustrating an example of a pattern determination process according to the embodiment in which a pattern to be used in the matching process tor feature points is determined.

Region determination module 202 starts loop 2 in which loop 3 described below is performed for each of the plurality of pixels included in one image among the plurality of images (S31).

Region determination module 202 starts loop 3 in which Steps S33 to S35 described below is performed for each of the plurality of pixels included in the current image (S32).

Using the result of the region determination process, region determination module 202 determines whether the current pixel is in a textured region (S33).

When determining that the current pixel is in a textured region (YES in S33), region determination module 202 determines a matching pattern of the first size as the matching pattern corresponding to the current pixel. The matching pattern of the first size is, for example, a matching pattern of a fixed size and shape.

When determining that the current pixel is not in a textured region, that is, when determining that the current pixel is in a texture-less region (NO in S33), region determination module 202 determines, as the matching pattern corresponding to the current pixel, a matching pattern of the second size that corresponds to the shape of the texture-less region to which the current pixel belongs. The matching pattern of the second size is determined to have a size and a pattern obtained by extending the region in a plurality of different directions from the current pixel as the center until a predetermined condition is satisfied. The plurality of different directions may be four directions upward, downward, rightward, and leftward, may be two or three directions among the four directions, may be eight directions upward to the right, downward to the right, upward to the left, and downward to the left in addition to the four directions, or may be other directions. The predetermined condition is that (i) the distance between the extended end and the center is equal to the maximum distance, (ii) the pixel at the extended end belongs to a textured region, or (iii) there is a significant difference between the local mean value of pixels at the extended end and the local mean value of the current pixels (in other words, a difference in the local mean value is greater than a threshold value).

After Step S34 or Step S35, region determination module 202 performs Steps S33 and S34 on a subsequent image among the plurality of images on which the processing in loop 3 has not yet been performed.

Furthermore, after the end of loop 3, region determination module 202 performs loop 3 on a subsequent image among the plurality of images on which the processing in loop 2 has not yet been performed.

Note that in reconstruction module 4 in the first example, region determination module 202 performs the pattern determination process, but, as described above in the case of reconstruction module 4A in the second example, each of 3D point reconstruction module 204A and 3D point increase module 206A may perform the pattern determination process.

Figure 9:
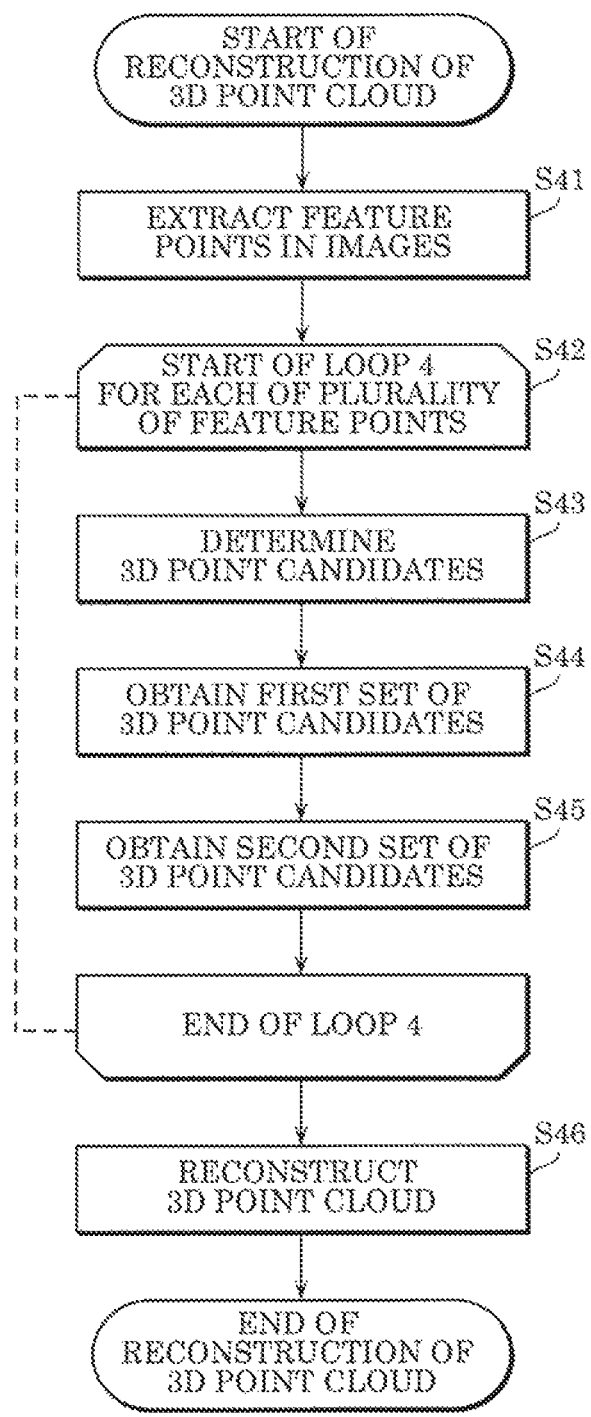
FIG. 9 is a flowchart illustrating an example of the process of reconstructing a 3D point cloud according to an embodiment.

FIG. 9 is a flowchart illustrating an example of the process of reconstructing the 3D point cloud according to the embodiment.

Three-dimensional point reconstruction module 204 extracts a plurality of feature points (key points) from each of the plurality of images (S41).

Next, using the plurality of feature point extracted from each of two images among the plurality of images, 3D point reconstruction module 204 performs a matching process of finding a match between the plurality of corresponding feature points of the two images. The matching process is, fax example, the processing in loop 4 described below.

Specifically, 3D point reconstruction module 204 starts loop 4 in which Steps S43 to S45 described below are performed for each of the plurality of feature points extracted in one image among the two images (S42).

Three-dimensional point reconstruction module 204 determines 3D point candidates from the plurality of feature points extracted from the other image among the two images by triangulation of the current feature point, along an epipolar line (S43).

On the basis of the matching pattern for use in the matching process for feature points, 3D point reconstruction module 204 obtains a first set of 3D point candidates that satisfies a first photo-consistency score (S44).

Three-dimensional point reconstruction module 204 obtains a second set of 3D point candidates by optimizing the first set of 3D point candidates on the basis of the matching pattern for use in the matching process for feature points (S45).

After Step S45, 3D point reconstruction module 204 performs Steps S43 to S45 on a subsequent feature point among the plurality of feature points on which the processing in loop 4 has not yet been performed.

As a result of Steps S43 to S45, a plurality of pairs of corresponding feature points are obtained. The processes in Steps S41 to S45 may be performed on all the combinations that can be obtained by extracting two of the plurality of images.

At the end, 3D point reconstruction module 204 selects, from among the second set of 3D point candidates, 3D point candidates that meet better photo-consistency scores, and outputs a sparse a 3D point cloud made of the selected 3D point clouds (S46).

Note the photo-consistency score may be calculated on the basis of the normalized cross correlation (NCC) technique or a derivative thereof. Techniques other than the NCC, such as the sums of squared differences (SSD), may also be used to compute the photo-consistency score.

Figure 10:
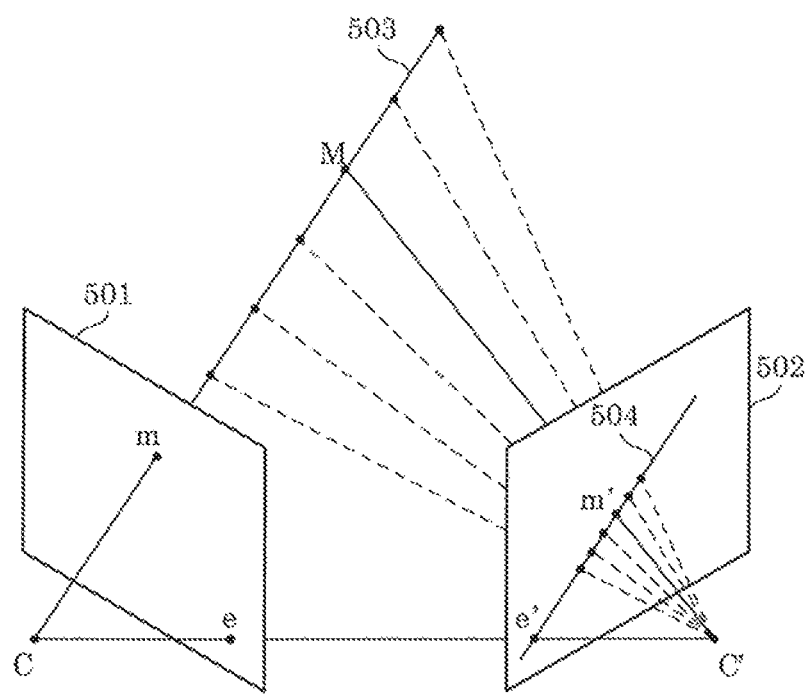
FIG. 10 is a diagram illustrating an epipolar constraint of a pair of feature points between two images.

FIG. 10 is a diagram illustrating epipolar constraint of a pair of feature points between two images.

An example will be described in which, suppose 2D point m in image 501 obtained by capturing an image of 3D point M in the 3D space is a feature point, a feature point corresponding to 2D point m is obtained from image 502 using an epipolar constraint. First, using the external parameter of each camera, optical center C of a camera that has captured image 501 and optical center C' of a camera that has captured image 502 are determined. Subsequently, straight line 503 in the 3D space that passes through optical center C and 2D point m is calculated using optical center C of the camera and the coordinates of 2D point in in image 501. Next using straight line 503 and the external parameter of the camera that has captured image 502, epipolar line 504 on image 502 which corresponds to straight line 503 is calculated. Subsequently, the feature points on epipolar line 504 in 502 are triangulated, and thus 3D point candidates can be obtained. In other words, all the feature points on epipolar line 504 can be used as candidates for specifying 2D point m' corresponding to 2D point in on straight line 503.

Figure 11:
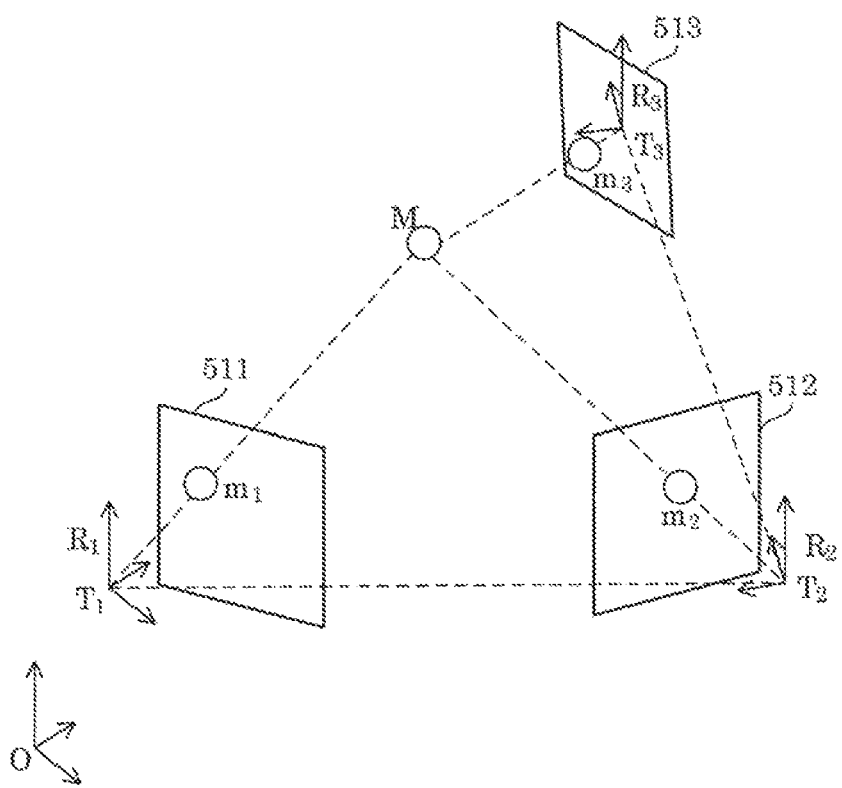
FIG. 11 is a diagram for describing a method for estimating a camera parameter and a method for reconstructing a 3D model.

FIG. 11 is a diagram for describing a method for estimating a camera parameter and a method for reconstructing a 3D model. An example will be explained in which the internal parameters of the cameras are known, and using three frames (image 511, image 512, and image 513), external parameters of the cameras are estimated, and a 3D model of a subject is reconstructed.

In order to obtain the camera parameter of each of the cameras, it is necessary to calculate rotation matrices R1, R2, R3 and translation vectors T1, T2, T3 of the cameras in the world coordinate system with the origin at zero (0). First, a method for calculating the rotation matrices and the translation vectors of the cameras that have captured image 511 and image 512 will be described. When point $m_1=(u_1, v_1, 1)$ on image 511 and point m2 on image 512 correspond to each other, an epipolar equation satisfying Equation 1 holds true for these points.

[Math. 1]

$$m_1^T F m_2 = 0 \quad \text{(Equation 1)}$$

Here, F is called a fundamental matrix (F matrix). Using internal parameter K of each of the cameras, reconstruction module 4 is capable of obtaining points as $m_1=(x_1, y_1, z_1)$ and $m_2=(x_2, y_2, z_2)$ in the coordinate systems of the respective cameras according to the conversion equation indicated in Equation 2. The epipolar equation can be rewritten as in Equation 3.

[Math. 2]

$$\tilde{m} = Km \quad \text{(Equation 2)}$$

[Math. 3]

$$\tilde{m}_1^T E \tilde{m}_2 = 0 \quad \text{(Equation 3)}$$

Here, E is called an essential matrix (E matrix). Reconstruction module 4 is capable of calculating each element of the E matrix using a plurality of corresponding points. Furthermore, after calculating each element of the F matrix using a plurality of corresponding points such as points $m_1$ and $m_2$ between images, reconstruction module 4 may obtain the E matrix according to the conversion equation in Equation 4.

$$E = K^{-1} F K \quad \text{(Equation 4)}$$

By decomposing the E matrix, reconstruction module 4 can obtain a rotation matrix and a translation vector from image 511 to image 512 in the world coordinate system. When the position of the first camera in the world coordinate system and the slope of the first camera with respect to each axis of the world coordinate system are known, reconstruction module 4 can obtain the positions and the attitudes of the first and second cameras in the world coordinate system using the relative relationship between the first camera and the second camera. Reconstruction module 4 may measure in advance or calculate the position and the attitude of the first camera in the world coordinate system using camera information other than video (for example, information obtained by sensors such as a gyroscope, an acceleration sensor, or the like included in the camera). Furthermore, assuming the camera coordinate system of the first camera as the world coordinate system, the position and the attitude of another camera may be calculated.

Note that lens distortion of a camera is taken into consideration, reconstruction module 4 corrects the position of a point on an image using a distortion model and obtains F matrix or an E matrix using the corrected position. Reconstruction module 4 uses, as an example, a distortion model for the radial direction of the lens indicated in Equation 5.

$$u_{undistorted} = u(1+k_1 r^2 + k_2 r^4 + k_3 r^6)$$

$$v_{undistorted} = v(1+k_1 r^2 + k_2 r^4 + k_3 r^6)$$

$$r^2 = u^2 + v^2 \quad \text{(Equation 5)}$$

Furthermore, with a triangle formed using the rotation matrices and the translation vectors of image 511 and image 512, reconstruction module 4 can obtain the coordinates of 3D point M in the world coordinate system which corresponds to the corresponding points.

Furthermore, the aforementioned geometrical relationship can be extended to three viewpoints. In the case where image 513 is added to image 511 and image 512, reconstruction module 4 further calculates E matrix for images 512, 513 and an E matrix for images 511, 513, and obtains relative rotation matrix and translation vector between each pair of cameras. By integrating these results, reconstruction module 4 can calculate a rotation matrix and a translation vector of the camera for image 513 in the world coordinate system.

The rotation matrix and the translation vector of image 513 may be calculated using corresponding points between image 513 and image 511 and between image 513 and 512. Specifically, corresponding points between image 511 and image 513 and corresponding points between image 512 and image 513 are determined. Here, assume that point $m_3$ on image 513 which corresponds to point $m_1$ on image 511 and point $m_2$ on image 512 is obtained, the coordinates of 3D point M corresponding to these points have already been obtained, and thus the relationship between a point on image 513 and coordinates in the 3D space can be obtained. At this time, Equation 6 holds.

[Math. 4]

$$\tilde{m} = Pm \quad \text{(Equation 6)}$$

Here, P is called a perspective matrix (P matrix). The relationship in Equation 7 holds true for the P matrix, the E matrix, and the internal matrix; thus, reconstruction module 4 can obtain the E matrix of image 513 and accordingly determine the rotation matrix and the translation vector thereof.

$$P = KE \quad \text{(Equation 7)}$$

Note that even when the internal parameter is not known, after calculating the F matrix or the P matrix, reconstruction module 4 can determine the internal matrix and the E matrix by dividing the F matrix and the P matrix under the constraint that the internal matrix is an upper triangular matrix and the E matrix is a positive definite symmetric matrix.

Figure 12:
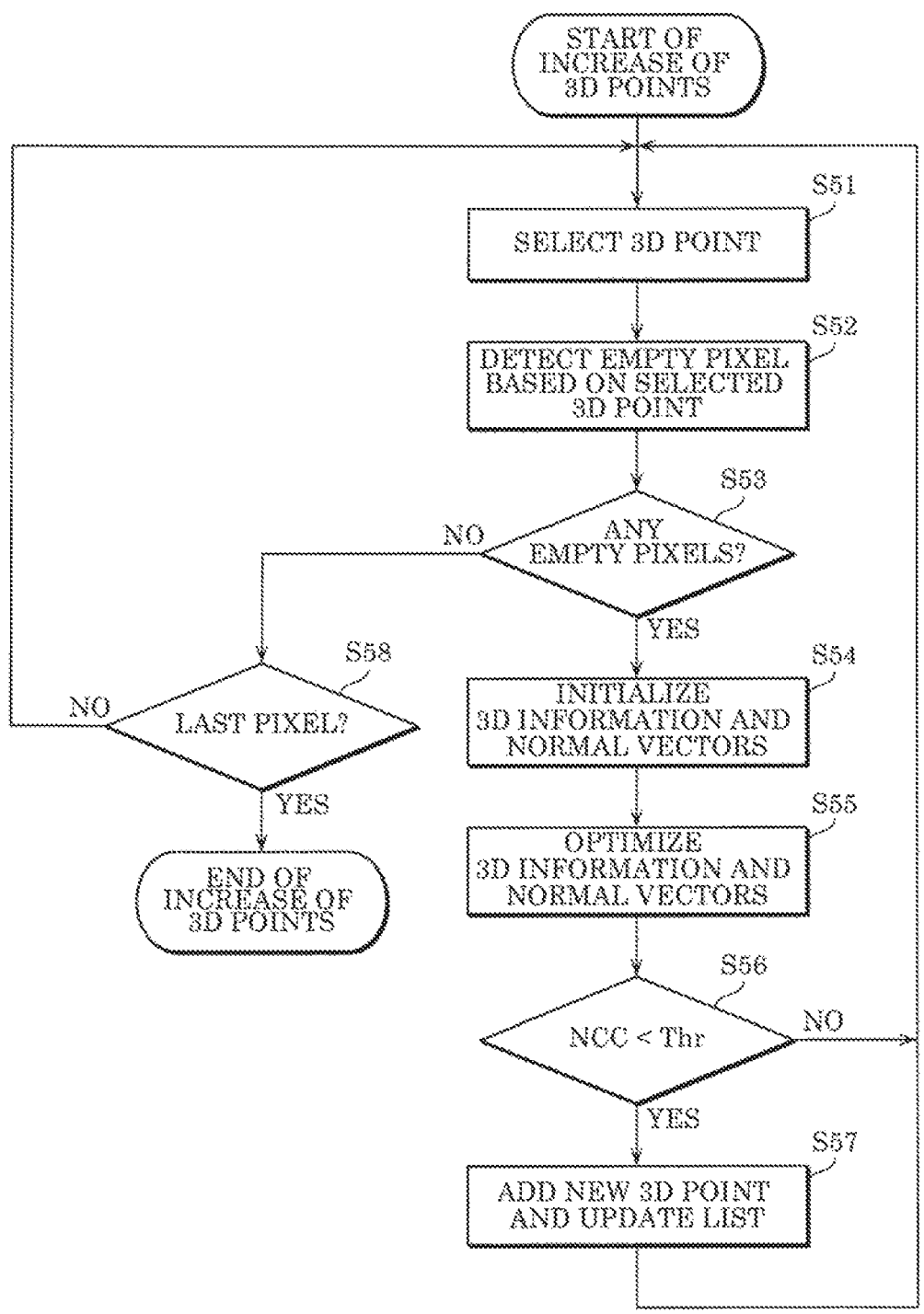
FIG. 12 is a flowchart illustrating an example of the process of increasing 3D points in a 3D point cloud according to an embodiment.

FIG. 12 is a flowchart illustrating an example of the process of increasing 3D points in the 3D point cloud according to the embodiment.

Three-dimensional point increase module 206 selects, as a current 3D point, one 3D point from among all the 3D points included in the 3D point cloud (S51).

Next, 3D point increase module 206 detects an empty pixel on the basis of the selected 3D point (S52). An empty pixel indicates a pixel with no corresponding 3D points. For example, for each of the plurality of 3D points, 3D point increase module 206 may determine in advance whether or not a pixel corresponding to the 3D point is included in each of the plurality of images. Three-dimensional increase module 206 may associate the determination result with all the 3D points. For example, every 3D point may hold correspondence information indicating which pixel on which image the 3D point corresponds to. In the case where the correspondence information has been held in the 3D point, 3D point increase module 206 can efficiently detect which pixel on which image the selected 3D point corresponds to. Furthermore, 3D point increase module 206 can efficiently detect an empty pixel around the corresponding pixel.

Next, 3D paint increase module 206 determines whether there is any empty pixel (S53).

When determining that there is an empty pixel (YES in S53), 3D point increase module 206 initializes 3D information and normal vectors of the detected empty pixel (S54).

Three-dimensional point increase module 206 optimizes the initialized 3D information and normal vectors using the NCC (S55).

Three-dimensional point increase module 206 compares the NCC and threshold value Thr and determines whether or not the NCC is greater than threshold value Thr (S56).

When determining that the NCC is greater than threshold value Thr (YES in S56), 3D point increase module 206 updates a list of 3D points and a list of empty pixels by adding a new 3D point (S57).

When determining that the NCC is less than or equal to threshold value Thr (NO in S56) or after Step S57, 3D point increase module 206 returns to Step S51 and selects the next current 3D point from among all the 3D point included in the 3D point cloud.

When determining in Step S53 that there are no empty pixels (NO in S53), 3D point increase module 206 determines whether or not the current pixel is the last pixel (S58).

When determining that the current pixel is the last pixel (YES in S58), 3D point increase module 206 ends the process of increasing 3D points. When determining that the current pixel is not the last pixel (NO in S58), 3D point increase module 206 returns to Step S51 and selects the next current pixel from among all the 3D points included in the 3D point cloud.

Note that the empty pixel may refer to a pixel having no 3D information.

Figure 13:
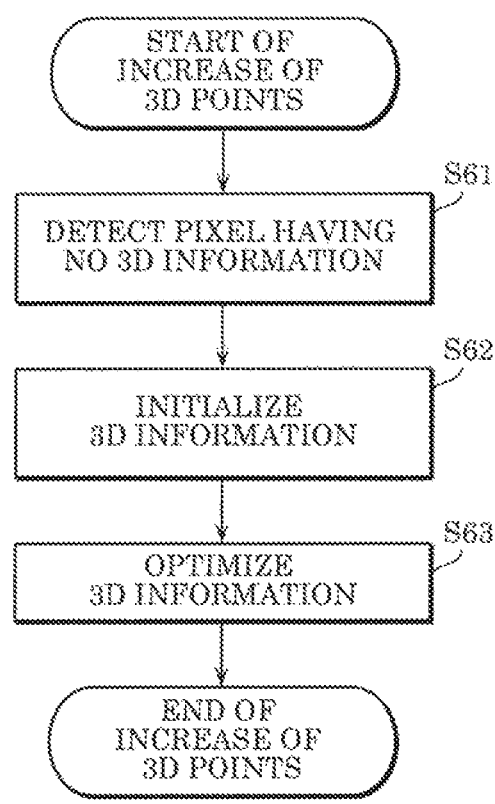
FIG. 13 is a flowchart illustrating an example of the process of increasing 3D points in a 3D point cloud according to an embodiment.

FIG. 13 is a flowchart illustrating an example of the process of increasing 3D points in the 3D point cloud according to the embodiment.

Three-dimensional increase module 206 detects a pixel having no 3D information (S61).

Three-dimensional increase module 206 initializes each of one or more pixels having no 3D information so that 3D information of the nearest pixel having 3D information is applied (S62).

Three-dimensional increase module 206 converts initial 3D information of the initialized pixel by optimizing a similarity score to improve the accuracy of 3D information (S63). The optimization of the similarity score may be achieved by minimizing dissimilarity of the plurality of pixels between the plurality of images. The dissimilarity is the reverse of the photo-consistency score.

Note that in the process of increasing 3D points, one or both of the process in FIG. 12 and the process in FIG. 13 may be performed.

Figure 14A:
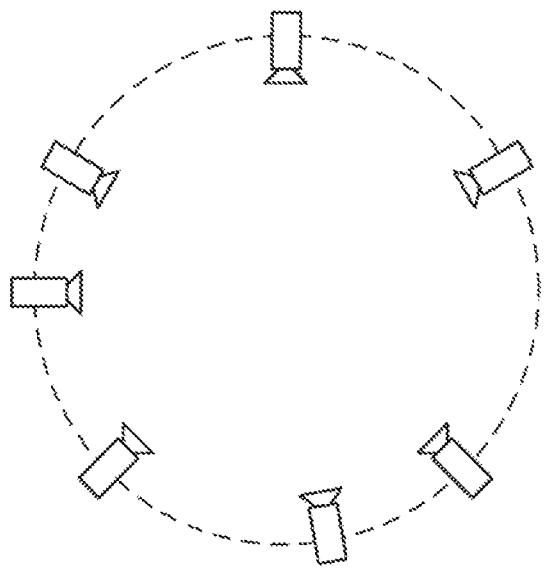
FIG. 14A is a diagram illustrating a camera layout example applied to perform a 3D point cloud reconstruction method (3D reconstruction)
Figure 14B:
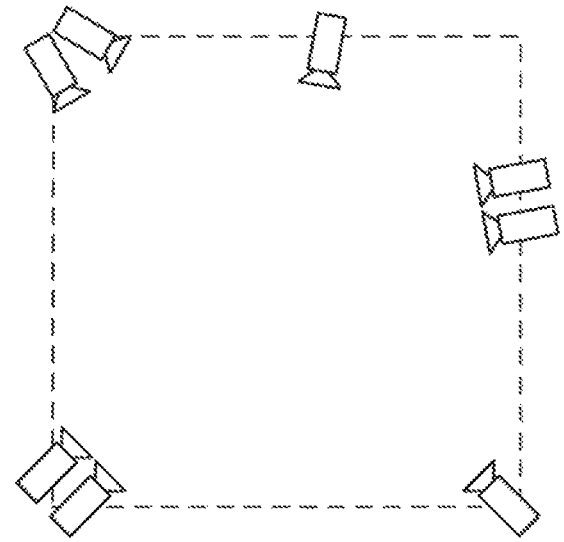
FIG. 14B is a diagram illustrating a camera layout example applied to perform a 3D point cloud reconstruction method (3D reconstruction)

FIG. 14A and FIG. 14B are diagrams each illustrating a camera layout example applied to perform a 3D point cloud reconstruction method (3D reconstruction).

In the case where a plurality of cameras are arranged in a space in order to perform the 3D reconstruction, the plurality of cameras may be dispersed by separating each of the cameras from an adjacent one of the cameras so that the distance between the adjacent cameras is greater than or equal to a predetermined distance as illustrated in the schematic diagram in FIG. 14A.

A plurality of cameras may be dispersed in a space by setting one or more cameras including two cameras as a group and separating each camera group from an adjacent camera group so that the distance between the adjacent camera groups is greater than or equal to a predetermined distance as illustrated in the schematic diagram in FIG. 14B. In this case, one camera may be treated as a camera group. In other words, a camera group made up of one camera and a camera group made up of two or more cameras may be mixed. Note that two or more cameras belonging to the same camera group may be cameras located in close proximity to each other at less than the predetermined distance or may be cameras having optical axis directions with a difference less than a predetermined angle range. Note that stereo camera may be used as the type of a standalone camera; in the case of using the stereo camera, distance information may be obtained using a single position. Note that the cameras do not need to be installed at the same level and may be installed at different levels.

When the standalone cameras are arranged, the 3D reconstruction is performed with reference to information of one or more other cameras. When the cameras including the camera groups are arranged, a stepwise process may be performed in which the 3D point cloud is generated and the distance information is obtained on per camera group basis, and the results of the camera groups are integrated to perform the 3D reconstruction. Furthermore, as in arrangement of the standalone cameras, information may be referred to between the camera groups to perform the 3D reconstruction.

Figure 15:
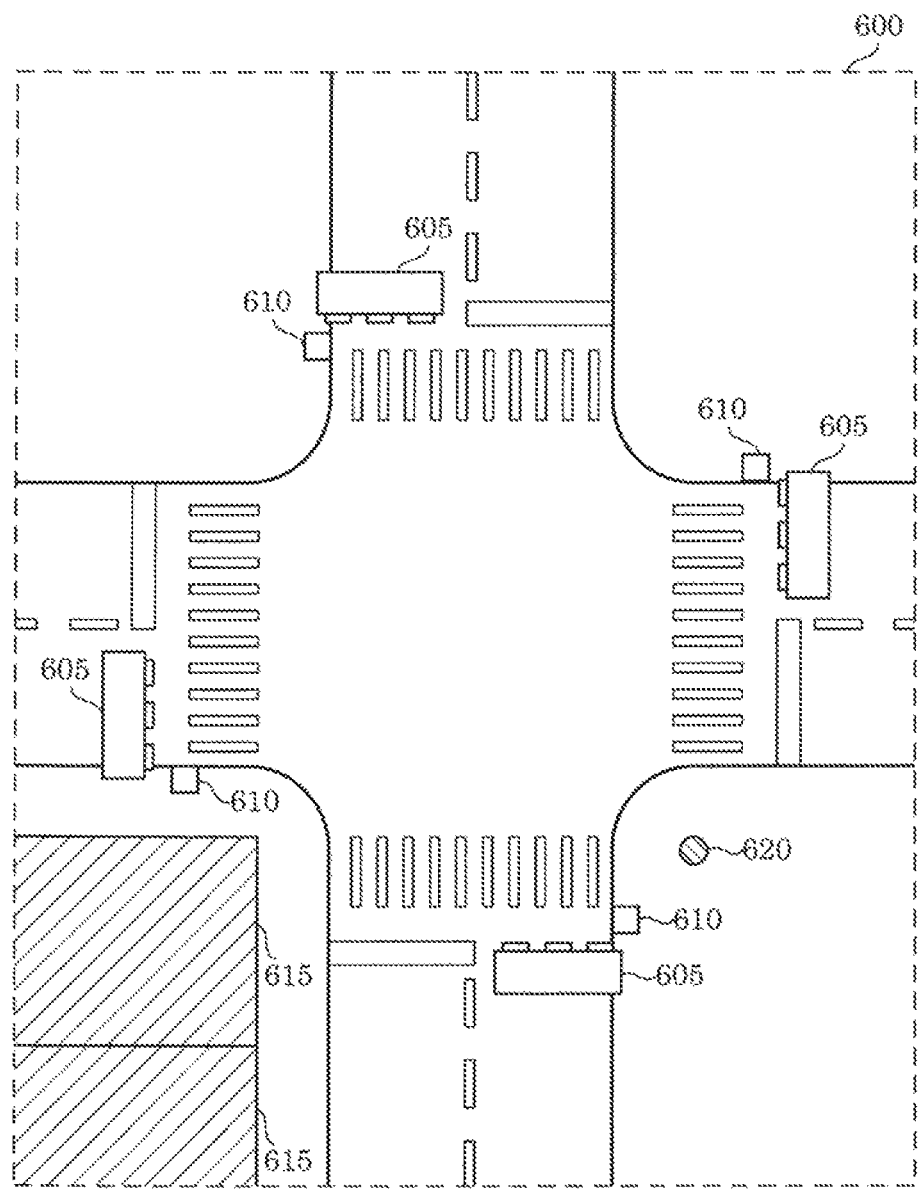
FIG. 15 is a diagram illustrating a specific example of a camera arrangement method applied to perform a 3D point cloud reconstruction method (3D reconstruction) according to the present disclosure.

FIG. 15 is a diagram illustrating a specific example of a camera arrangement method applied to perform a 3D point cloud reconstruction method (3D reconstruction) according to the present disclosure.

The case where the cameras are arranged at an intersection as a specific example of the camera arrangement, method will be described.

An example of the method for arranging the plurality of cameras at intersection 600 to perform the 3D reconstruction is as follows.

In order to capture images from above a roadway, the standalone camera, the camera group, or both is arranged on each of four traffic signals 605.

In order to capture images from above a sidewalk, the standalone camera, the camera group, or both is arranged on pedestrian signal 610, structure 615, and installation pole 620.

Note that when there are structures such as a footbridge and a lighting fixture, the cameras, etc., may be arranged on the structures.

The camera may be arranged in the air above the center of the intersection.

Mobile cameras such as an onboard camera and a camera mounted on a drone may be used.

A camera layout that is the same as or similar to that applied to the intersection described above may be applied to a level crossing.

Figure 16:
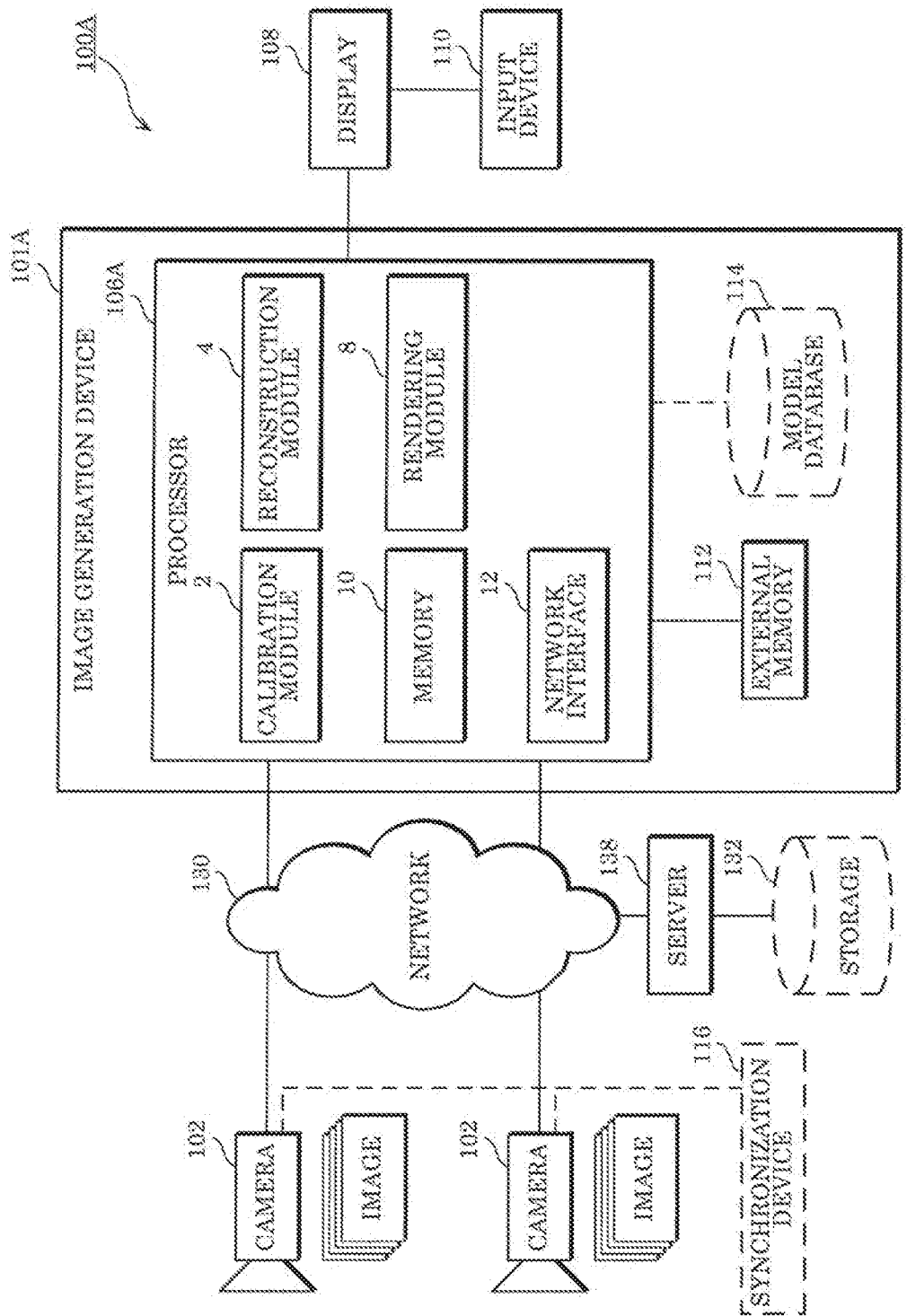
FIG. 16 is a block diagram illustrating an example of the configuration of an image generation system according to a variation.

In the above embodiment, image generation system 100 is configured so that the plurality of images captured by the plurality of cameras 102 are output to image generation device 101 via the plurality of image-capturing devices 104, but this is not limiting. For example, it is possible to apply a configuration such as that of image generation system 100A illustrated in FIG. 16 in which the plurality of images captured by the plurality of cameras 102 are output to image generation device 101A via network 130. In this case, the plurality of images may be temporarily accumulated in storage 132 of server 138 via network 130. Image generation device 101A may be configured to obtain, via network interface 12 of processor 105A, the plurality of images accumulated in storage 132 of server 138.

Such view-dependent synthesis is useful in a wide range of applications including the medical industry, the film industry, the video game industry, the building industry, the scientific community and the engineering community.

The above-described view-dependent synthesis requires practical rendering and high image quality that minimize visual discomfort. Furthermore, a method for handling visibility, occlusion, and a difference in color or luminance is needed.

With the reconstruction method according to the present embodiment, since the matching process is performed using the matching pattern of a size and shape dynamically changed according to image information, it is possible to improve accuracy and robustness and reduce processing time.

The reconstruction method and the reconstruction according to the present embodiment are methods and devices for reconstructing a 3D model of a scene that can be used for 3D applications. In the reconstruction method, the variance heat map is calculated for each image, and a heat map of texture edges is also calculated for each image. In the reconstruction method, by using the variance heat map and the heat map of texture edges, large variance regions and edge regions are defined as textured regions while other regions are defined is texture-less regions. A pixel in the textured region can be distinguished from neighboring pixels by a small matching pattern of the first size along the pixel. Therefore, a small matching pattern can be selected from a predetermined pattern set, and it is possible to use photometric similar evaluation for 3D reconstruction. A pixel in the texture-less region cannot be distinguished well from neighboring pixels by a small matching pattern because there are not enough textures. In order to collect enough textures, the matching pattern for photometric similar evaluation is a region extended in different directions from a given pixel. For each direction, the extension of the region for determining a matching pattern stops when any of the following conditions are satisfied: (i) the distance between the extended end and the center is equal to the maximum distance, (ii) the pixel at the extended end belongs to a textured region, and (iii) there is a significant difference between the local mean value of pixels at the extended end and the local mean value of the current pixels (in other words, a difference in the local mean value is greater than a threshold value). By this extension, the matching pattern can collect more useful texture information to distinguish the pixel from neighboring pixels. Therefore, this matching pattern is robust for photometric similar evaluation and allows generation of an accurate 3D model.

The intensity variance of a given pixel is calculated using some neighboring pixels including the given pixel. Among the values of intensity variance calculated, a variance value greater than a predetermined threshold value represents a region having rich textures, and the rich textures are robust for photometric similar evaluation. Therefore, for a pixel with a variance value greater than the predetermined threshold value, it is possible to use a small pattern for accurate, efficient 3D reconstruction.

Although the present disclosure is described based on the above embodiment, it goes without saying that the present disclosure is not limited to the above embodiment. The following cases are also included in the present disclosure.

(1) The respective devices described above may be specifically configured as a computer system made up of a microprocessor, a read only memory (ROM), a random access memory (RAM) a hard disk unit, a display unit, a keyboard, a mouse, and so on. A computer program is stored in the RAM or the hard disk unit. The respective devices achieve their functions by way of the microprocessor operating according to the computer program. Here, the computer program is configured of a combination of a plurality of command codes indicating instructions to a computer in order to achieve a predetermined function.

(2) Some or ail of the structural elements included in each of the above-described devices may be one system LSI (Large Scale Integration: large scale integrated circuit). The system LSI is a super multifunctional LSI manufactured by integrating a plurality of components onto a signal chip. Specifically, the system LSI is a computer system configured of a microprocessor, a ROM, a RAM, and so on. A computer program is stored in the ROM. The system LSI achieves its function by way of the microprocessor loading the computer program from the ROM into the RAM and performing operations such as calculations according to the computer program.

(3) Some or all of the structural elements included in each of the above-described devices may be implemented as a standalone module or an IC card that can be inserted into and removed from the corresponding device. The IC card or the module is a computer system made up of a microprocessor, a ROM, a RAM, and so on. The IC card or the module may include the aforementioned super multifunctional LSI. The IC card or the module achieves its functions by way of the microprocessor operating according to the computer program. The IC card and the module may be tamperproof.

(4) The present disclosure may be implemented as the above-described methods. Furthermore, the present disclosure may be implemented as a computer program for implementing these methods using a computer or may be a digital signal of the computer program.

Furthermore, the present disclosure may be implemented as a computer program or a digital signal recorded on a computer-readable recording medium, such as a flexible disk, a hard disk, a compact disc (CD-ROM), a magneto-optical disc (MO), a digital versatile disc (DVD), DVD-ROM, DVD-RAM, a Blu-ray (registered trademark) disc (BD), or a semiconductor memory, for example. The present disclosure may also be implemented as a digital signal recorded on the aforementioned recoding media.

Furthermore, in the present disclosure, the computer program or the digital signal may be transmitted via an electrical communication line, a wireless or wired communication line, a network represented by the Internet, data broadcasting, or the like.

Furthermore, the present disclosure may be a computer system including a microprocessor and a memory. The memory may store the computer program and the microprocessor may operate according to the computer program.

Moreover, by transferring the recording medium having the program or the digital signal recorded thereon or by transferring the program or the digital signal via the network or the like, the present disclosure may be implemented by a different independent computer system.

(5) The above embodiment and the above variation may be combined with each other.

Note that in the above embodiment, each of the structural elements may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for realizing the reconstruction method and the reconstruction device, etc., according to the above embodiment is a program described below.

Specifically, this program causes a computer to execute a reconstruction method for reconstructing a three-dimensional (3D) model by a processor using a plurality of two-dimensional (2D) images obtained by a plurality of cameras disposed in different positions and attitudes capturing a same target space in a 3D space. The reconstruction method includes: determining, according to image information of each of the plurality of 2D images, a size and a shape of a matching pattern to be used in a matching process for feature points included in the plurality of 2D images; reconstructing a first 3D point cloud including a plurality of 3D points by performing the matching process based on the matching pattern determined; generating a second 3D point cloud including 3D points increased by adding a new 3D point to the first 3D point cloud using the plurality of 2D images; and reconstructing the 3D model using the second 3D point cloud.

Although the reconstruction method and the reconstruction device according to one or more aspects of the present disclosure have been described thus far based on the embodiment, the present disclosure is not limited to the above-described embodiment. Various modifications of the present embodiment as well as embodiments resulting from combinations of structural elements in different exemplary embodiments that may be conceived by a person having ordinary skill in the art are intended to be included within the scope of the present disclosure as long as these do not depart from the essence of the present disclosure.

What is claimed is:

1. A reconstruction method for reconstructing a three-dimensional (3D) model by a processor using a plurality of two-dimensional (2D) images obtained by a plurality of cameras disposed in different positions and attitudes capturing a same target space in a 3D space, the method comprising:
- determining, according to each of the plurality of 2D images, a size and a shape of a matching pattern to be used in a matching process for feature points included in the plurality of 2D images;
- reconstructing a first 3D point cloud including a plurality of 3D points by performing the matching process based on the matching pattern determined;
- generating a second 3D point cloud including 3D points increased by adding a new 3D point to the first 3D point cloud using the plurality of 2D images; and
- reconstructing the 3D model using the second 3D point cloud,
- wherein each of the plurality of 2D images includes one or more regions,
- each of the one or more regions is classified as either a textured region or a texture-less region, and
- in the determining, for each region of the one or more regions, the matching pattern to be used in the matching process for a feature point included in the each region varies depending on whether the each region is the textured region or the texture-less region.

2. The reconstruction method according to claim 1, wherein
the determining includes:
determining a pattern of a first size as the matching pattern for a first region classified as the textured region; and
determining a pattern of a second size as the matching pattern for a second region classified as the texture-less region, the second size being larger than the first size.

3. The reconstruction method according to claim 2, wherein
the classifying includes:
calculating a variance map and an edge map based on pixel values of a plurality of pixels included in each of the plurality of 2D images; and
classifying the one or more regions included in the 2D image as the textured region and the texture-less region using the variance map and the edge map calculated.

4. The reconstruction method according to claim 1, further comprising:
determining whether each region of the one or more regions is the textured region or the texture-less region, based on a variance heat map obtained for each of the plurality of 2D images, the variance heat map including a plurality of variances,
wherein the determining of whether the each region of the one or more regions is the textured region or the texture-less region includes calculating each of the plurality of variances from a plurality of pixels included in a 2D image corresponding to the variance heat map among the plurality of 2D images, each of the variances being a variance of a plurality of pixel values including (i) a pixel value of one pixel corresponding to the variance among the plurality of pixels and (ii) one or more pixel values of one or more pixels surrounding the one pixel.

5. A reconstruction device which reconstructs a three-dimensional (3D) model using a plurality of two-dimensional (2D) images obtained by a plurality of cameras disposed in different positions and attitudes capturing a same target space in a 3D space, the device comprising:
a memory; and
a processor which performs operations including:
- determining, according to each of the plurality of 2D images, a size and a shape of a matching pattern to be used in a matching process for feature points included in the plurality of 2D images;
- reconstructing a first 3D point cloud including a plurality of 3D points by performing the matching process based on the matching pattern determined;
- generating a second 3D point cloud including 3D points increased by adding a new 3D point to the first 3D point cloud using the plurality of 2D images; and
- reconstructing the 3D model using the second 3D point cloud,
- wherein each of the plurality of 2D images includes one or more regions,
- each of the one or more regions is classified as either a textured region or a texture-less region, and
- in the determining, for each region of the one or more regions, the matching pattern to be used in the matching process for a feature point included in the each region varies depending on whether the each region is the textured region or the texture-less region.

6. The reconstruction device according to claim 5, wherein the processor performs further operations comprising:
determining whether each region of the one or more regions is the textured region or the texture-less region, based on a variance heat map obtained for each of the plurality of 2D images, the variance heat map including a plurality of variances,
wherein the determining of whether the each region of the one or more regions is the textured region or the texture-less region includes calculating each of the plurality of variances from a plurality of pixels included in a 2D image corresponding to the variance heat map among the plurality of 2D images, each of the variances being a variance of a plurality of pixel values including (i) a pixel value of one pixel corresponding to the variance among the plurality of pixels and (ii) one or more pixel values of one or more pixels surrounding the one pixel.

7. A generation device, comprising:
a communication interface via which two-dimensional (2D) images are to be received, the 2D images having been generated by photographing a space from different viewpoints with at least one camera; and
a processor connected to the communication interface and configured to:
- determine, according to the 2D images, a matching pattern to match feature points included in two pictures among the 2D images;
- match the feature points according to the matching pattern in order to generate first three-dimensional (3D) points, the first 3D points indicating respective first positions in the space;
- generate a second 3D point based on the 2D images, the second 3D point indicating a second position in the space; and
- generate a 3D model of the space based on the first 3D points and the second 3D point
wherein each of the plurality of 2D images includes one or more regions,
each of the one or more regions is classified as either a textured region or a texture-less region, and
in the determining of the matching pattern, for each region of the one or more regions, the matching pattern to be used in the matching process for a feature point included in the each region varies depending on whether the each region is the textured region or the texture-less region.

8. The generation device according to claim 7, wherein the processor is further configured to:
- determine whether each region of the one or more regions is the textured region or the texture-less region, based on a variance heat map obtained for each of the plurality of 2D images, the variance heat map including a plurality of variances,
- wherein the determining of whether the each region of the one or more regions is the textured region or the texture-less region includes calculating each of the plurality of variances from a plurality of pixels included in a 2D image corresponding to the variance heat map among the plurality of 2D images, each of the variances being a variance of a plurality of pixel values including (i) a pixel value of one pixel corresponding to the variance among the plurality of pixels and (ii) one or more pixel values of one or more pixels surrounding the one pixel.

* * * * *